United States Patent Office 3,634,270
Patented Jan. 11, 1972

3,634,270
INHIBITOR
James P. Engle, Tulsa, Okla., Billy D. Oakes, Midland, Mich., and Cecil F. Reich, Tulsa, Okla., assignors to The Dow Chemical Company, Midland, Mich.
No Drawing. Continuation of application Ser. No. 261,509, Feb. 27, 1963. This application June 20, 1969, Ser. No. 859,528
Int. Cl. C11d 7/00
U.S. Cl. 252—149                  8 Claims

ABSTRACT OF THE DISCLOSURE

A corrosion inhibitor composition for aqueous inorganic and organic acid solutions containing an amine reaction product in ethylene glycol, a nonionic detergent and a sulfur containing compound.

---

This is a continuation of application Ser. No. 261,509, filed Feb. 27, 1963, now abandoned.

The present invention relates to a new and useful inhibitor which prevents the corrosion of metals in contact with corrosive solutions. More particularly the present invention concerns a synergistic mixture of organic nitrogen and sulfur compounds which when introduced into corrosive solutions prevent the attack of the corrosive ingredient of the solution on metal.

It has now been found that a sulfur compound and the reaction product formed by combining certain active hydrogen containing nitrogen compounds with organic ketones having at least one hydrogen atom on the carbon atom alpha to the carbonyl group and an aldehyde selected from the group consisting of aliphatic aldehydes containing from 1 to 16 carbons, and aromatic aldehydes of the benzene series, having no functional groups other than aldehyde groups, and a fatty acid in the presence of a strong acid catalyst, will effectively prevent the attack by aqueous solutions of corrosive materials on metals, e.g., ferrous metals and copper, zinc, etc. It has also been found advantageous to incorporate a non-ionic surfactant such as alkylphenoxy polyalkyleneoxy-alkanol to facilitate the preparation of clear solutions of the inhibitor in the corrosive solution. It is thus to be understood that the surfactant is not necessary but accomplishes an aesthetic quality and assists in holding scale, etc. in suspensions in the more common usage to which aqueous solutions of the corrosive materials are employed, i.e., boiler and heat exchanger (industrial) cleaning.

The compositions here under consideration have several advantages over the known inhibitors, one of which is better inhibition with attendant higher cleaning power since the corrosive material, for example, an inorganic acid or an organic acid, such as HCl, $H_2SO_4$ or alkylene diamine tetracetic acid, partial ammoniated salt, is not depleted in attacking the metal. Another advantage is that the present composition does not leave deposits on the metallic surfaces as do many other inhibitors. A still further advantage of the present system is that the inhibitor can be prepared, if necessary, in a manner such that no chloride ion is introduced into the system through the inhibitors. Still another advantage is that copper, zinc, etc. are not attacked or attacked only mildly and no deposits are left. These and other advantages will become apparent to those skilled in the art from the following description and examples.

In preparing the nitrogen containing compound of the inhibitor of the present invention a nitrogen compound containing at least one active hydrogen attached to the nitrogen atom per molecule is reacted with a ketone having at least one hydrogen atom attached to the carbon atom alpha to the carbonyl group, an aldehyde, and a fatty acid, preferably in the presence of an acid catalyst, at a temperature of from about 150° to about 250° F. for from 1 to about 24 hours. The crude reaction product is then mixed with an additional quantity of the fatty acid to bring the weight ratio of fatty acid to active hydrogen-aldehyde-ketone-HCl adduct to 0.3 to 24 parts of fatty acid per part of adduct. It is preferably, but not essential to carry out the above reaction in the presence of a solvent such as a glycol or polyglycol. If the solvent is not employed in the reaction it has been found advantageous to add it after reaction to facilitate handling. This product is then mixed with the sulfur compound to prepare the inhibitor of the present invention.

A preferred embodiment for preparing the inhibitor of the present invention is to first prepare the nitrogen compound by reacting (A) about 1 mole of active hydrogen compound and from 2 to 10 moles of aldehyde and from 1.5 to 10 moles of ketone, and 0 to 5 moles of acid catalyst if desired, with (B) from 0.3 to 24 and preferably from 0.3 to 3 parts by weight, based on reactant (A), of a fatty acid at a temperature from about 65 to about 120° C. (150° F. to 250° F.) for from 1 to 24 hours, in the presence of a glycol, e.g., ethylene glycol. Upon completion of the reaction additional fatty acid may be added with stirring to bring the weight ratio of fatty acid to adduct to 0.3 to 24 parts by weight of acid per part of adduct. Thereafter, the wetting agent in an amount of from about one part per 1 to 10 parts of inhibitor, and the alkyne (acetylenic) alcohol in an amount of from 1 part per 6 to 19 parts of inhibitor can be added with stirring. The nitrogen inhibitor is then mixed with from ¼ to 2 times its weight of a sulfur compound or the two materials added in any order, to the aqueous acid or other aqueous corrosive solutions.

It is to be understood that the nitrogen containing inhibitor referred to as nitrogen compound above is fully taught in U.S. Pat. No. 3,077,454.

The active hydrogen compounds which can be employed to prepare the nitrogen component of the present invention are those organic ammonia derivatives having at least one hydrogen atom attached to nitrogen, as for example, primary and secondary amines, diamines, amides, ureas, thioureas, ammonia and ammonium salts, alicylic amines, heterocyclic amines, aromatic amines, imidizolines containing a N-amine substituted side chain and the like which contain no group reactive under the conditions of the reaction other than hydrogen attached to nitrogen. Some of such compounds which have been found effective are the normal alkylamines having from 1 to 20 or more carbon atoms in the alkyl substituent, as for example, methylamine,, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, nonaldecylamine, eicosylamine, and mixtures thereof. The isoalkyl and ter.-alkylamines having up to 20 carbon atoms in the alkyl substituent such as for example, isopropylamine, isobutylamine, isoamylamine, and the like, ter.-butylamine, ter.-amylamine and the like; the dialkylamines having from 1 to 20 alkyl groups in the alkyl substituents such as dimethylamine, diethylamine, dipropylamine, dibutylamine, diamylamine, dihexylamine, diheptylamine, dioctylamine, didecylamine, dioctadecylamine and the like, as well as the diiso and tertiary alkylamines, and mixtures thereof. The diamines which are useful as the active hydrogen compound include those diamines having from 1 to 20 carbon atoms in the alkyl portions thereof such as methylenediamine, ethylenediamine, propylenediamine, butylenediamine, diaminopentane (see pentylenediamine), diaminohexane (hexylenediamine) and the like. In addition other nitrogen containing compounds having an active hydrogen on the nitrogen atom such as ammonia, ureas, thioureas, amides, ammonium salts and alicylic, heterocyclic and aromatic amines are operative as the active hydrogen compound in accordance with the present invention. Thus, one can employ ammonia, urea, thiourea, 1-acetyl-2-thiourea, N-allylthiourea, dithiobiuret, 1-phenyl-2-thiourea, 1,3-di(Rosin Amine D) thiourea, 1,3-dibutylthiourea and the like, acetamide, N-1-naphthylacetimide, oxamide, acetamide, adipamide, propionamide, thioacetamide, malonamide, formamide, alpha-cyanoacetamide, succinamide, n-butyramide, acetamide, dimethylacetamide, N-methylacetamide, n-butyloxamate, hexanimide, phthalimide, n-valeramide, isobutyramide, Armid 12 (95% dodecanamide, 4% tetradecanamide, 1% decanimide), N,N' - dibenzyldithiooxamide, dithiooxamide, Armid C (amide of coco fatty acids), 1-naphthaleneacetimide, Armid O (91% oleamide, 6% stearylamide, 3% inolamide, N,N' - dimethylthiooxamide, acetanilide, Armid HT (75% stearylamide, 22% palmitamide, 3% oleamide), nonanamide, N,N'-dicyclohexyldithiooxamide, benzamide, B-isothioureidopropionic acid, N,N'-bis(hydroxymethyl)-dithiooxamide, and the like, 2-methylpiperazine, morpholine, pyrrolidine, 2-aminoethylpiperazine, and the like, 2-naphthylamine, benzylamine, 2-aminopyridine, aniline and the like, 1,3-diphenyltriazine, and the like, ammonium chloride, monobasic ammonium phosphate, ammonium acetate, ammonium thiocyanate, ammonium oxalate, dibasic sodium ammonium phosphate and the like as well as the imidazolines such as 2-aminoethyl-1-n-heptyl-2-imidazoline, and the like, are effective sources of active hydrogen in accordance with the present invention.

The ketones which are operative in accordance with the present invention are those having at least one hydrogen atom on the carbon atom alpha to the carbonyl group. Some of such ketones found to be effective are the aliphatic and aryl substituted aliphatic ketones and mixtures thereof, as for example, acetophenone, 1-acetonaphthone, 1 part acetophenone+1 part acetone, p-methoxyacetophenone, propiophenone, p-chloroacetophenone, isophorone, tetrolophenone, 2,4-pentanedione, Ketosol (75% phenethyl alcohol, 25% acetophenone), 2-acetylcyclohexanone, 2-acetonaphthone, 2-thienylketone, methyl isobutylketone, n-butyrophenone, acetone, 3,4-dihydro-1(2H)-naphthalenone, 2-heptanone, diacetone alcohol, undecanone-2, and the like.

The class of fatty acids found to be operative include the alkyl carboxylic acids having from 1 to 20 carbon atoms, the olefinic carboxylic acids having from 2 to 20 carbon atoms and having from 1 to 2 or more unsaturated sites along the chain. In addition the various alkylene oxide adducts of the above acids have been found effective. Thus one can employ rendered animal fat, octanoic acid, myristic acid, pelargonic acid, abietic acid, acetic acid, lauric acid, formic acid, oleic acid, capric acid, tall oil acid, coco fatty acids+15 moles ethylene oxide, oleic acid+15 moles ethylene oxide, 70% rosin fatty acids+15 moles ethylene oxide, tall oil+4 moles propylene oxide+8 moles ethylene oxide, tall oil+6 moles propylene oxide+12 moles ethylene oxide, tall oil+8 moles propylene oxide+8 moles ethylene oxide, tall oil+4 moles propylene oxide+12 moles ethylene oxide, tall oil+4 moles propylene oxide+10 moles ethylene oxide, tall oil+6 moles propylene oxide+8 moles ethylene oxide, tall oil+6 moles propylene oxide+10 moles ethylene oxide, and the like.

The class of aldehydes which are operative in accordance with the present invention include the aldehydes having from 1 to 16 or more carbon atoms. Thus one can employ formaldehyde, urotropine, benzaldehyde, hexanal, octanal, decanal, hexadecanal, and the like.

Wetting agents which can be employed in some instances with the inhibitor are those selected from the classes known as anionic, nonionic, cationic and amphoteric. Some of such wetting agents are the mono and dialkyl phenols condensed with 10 to 50 moles of ethylene oxide such as the nonylphenols condensed with from 10 to 50 moles of ethylene oxide, disecondary butyl phenol condensed with from 5 to 30 moles of ethylene oxide, and the like, the polyethylene glycol alkyl mercaptans such as polyethylene glycol tertiary dodecyl mercaptan, ammonium isopropylbenzeneparasulfonate, diethanolamide of coconut oil, the difatty alkyl quaternary ammonium chlorides of mixed fatty alkyls such as octyl, decyl, dodecyl, tetradecyl, hexadecyl and octadecyl, and the like.

The alkynyl (acetylenic) alcohols which can be employed with the inhibitor of the present invention are those acetylenic alcohols having from 3 to 10 carbon atoms such as 1-propyn-3-ol, 1-butyn-3-ol, 1-pentyn-3-ol, 1-heptyn-3-ol, 1-octyn-3-ol, 1-nonyn-3-ol, 1-decyn-3-ol, and the like. The following alkynols are useful at temperatures below about 150° F. 1-ethynylcyclohexanol, methylbutynol, methylpentynol, butynediol and the like.

The acid catalyst which can be employed in preparing the inhibitor are the mineral acids such as sulfuric, hydrochloric, phosphoric, and the strong organic acids such as formic, acetic, propionic acids, and the like.

The sulfur-containing compound which is employed in the present invention as a synergist for the Mannich base ester is an organic sulfur containing compound having the sulfur present in the form of —S— or S═. Compounds which fall within this definition are thiourea, and the like as well as its aliphatic homologs, the aliphatic sulfides, the alkali metal thiocyanates; the aliphatic thiocyanates, the thioacids, the mercaptothiazolines, the mercaptans, the mercaptobenzothiazoles and mixtures of two or more members from the same or different classes.

The following examples illustrate the present invention but are not to be construed as limiting the same:

EXAMPLE 1

A three-necked one-liter flask was charged with

|  | Grams |
|---|---|
| Rosin Amine D | 156 |
| Paraformaldehyde | 65 |
| 90% formic acid | 109 |
| Acetophenone | 139 |
| Ethylene glycol | 490 |
| Conc. (98%) $H_2SO_4$ | 57 |

The flask and contents were heated under reflux (115° C.) for 16 hours with stirring. The flask and contents were cooled to room temperature and formulated with 1 part by weight based on the reaction mass of nonylphenoxy octaethyleneoxyethanol per 3 parts of reaction mass. The resulting formulation was employed in the following concentrations with allyl thiourea in 5% $H_2SO_4$ to determine the corrosion inhibiting properties on 1010 mild steel. The corrosion test was conducted by placing a weighed sample of 1010 mild steel into 150 ml. of 5% sulfuric acid containing the inhibitor, heating the acid to 150° F. and maintaining the temperature for 6 hours. At the end of the test the steel sample was weighed and the loss calculated in pounds per square foot per day.

Acid: 5% $H_2SO_4$
Length of test: 6 hours
Temperature: 150° F.
Steel Sample: AISI 1010 steel coupon 2¾″ x 1″ x ⅛″

| Inhibitor concentration, percent by weight, based on acid solution | | Corrosion rate, lbs./ft.²/day |
|---|---|---|
| Amine compound | Allyl-2-thiourea | |
| 0.2 | 0.1 | 0.0014 |
| 0.2 | 1.0 | 0.0019 |
| 0.1 | 0.1 | 0.0010 |
| 0.1 | 0.05 | 0.0020 |
| 0.3 | 0 | 0.026 |
| 0.2 | 0 | 0.023 |
| 0 | 0.3 | 0.034 |
| 0 | 0.1 | 0.025 |

EXAMPLE 2

In like manner as Example 1, employing 0.2% by weight of the same amine compound but other sulfur compounds the following corrosion rates were obtained, the rate of the two component mixtures is compared at the right with the same weight percent of the sulfur compound alone.

| Sulfur compound 0.1% by weight | Corrosion rate, lbs./ft.²/day | Comparative corrosion rate for 0.3% by weight sulfur compound only |
|---|---|---|
| Sodium mercaptobenzothiazole | 0.0019 | 0.05 |
| Thiourea | 0.0036 | 0.10 |
| Ethyl sulfide | 0.0026 | |
| Sodium thiocyanate | 0.0017 | 0.034 |
| Mercaptothiazoline | 0.0015 | 0.0094 |
| N,N'-di-n-propyl thiourea | 0.0012 | |
| Ethyl mercaptan | 0.0014 | |
| Methyl thiocyanate | 0.0015 | |
| N,N'-diallylthiourea | 0.0096 | |
| 1.0% FeS | 0.0024 | |

EXAMPLE 3

The following example illustrates the effect on corrosion rate when amines, other than Rosin Amine D, are employed in preparing the amine compound. The various amines are used in equivalent amounts to the Rosin Amine D. The procedure for preparation was the same as described in Example 1, as was the corrosion test.

| Primary amine used in place of Rosin Amine D: | Corrosion rate lbs./ft.²/day |
|---|---|
| Thiourea | 0.0017 |
| 2-(butylthio)ethyl amine | 0.00096 |
| 2-(dodecylthio)ethyl amine | 0.0020 |
| 1-allyl-2-thiourea | 0.00096 |

EXAMPLE 4

To illustrate the utility of the inhibitors of the present invention in preventing corrosion by acids other than $H_2SO_4$ the following tests were run employing the named acids. Details of the corrosion test and the inhibitor used were as described in Example 1 except as noted.

| Acid, water | Temp., °F. | Corrosion rate, lbs./ft.²/day |
|---|---|---|
| 21% $H_3PO_4$ | 150 | 0.0001 |
| 2% formic + 1% citric | 200 | 0.0011 |
| 3% formic | 200 | 0.0011 |
| 3% hydroxyacetic | 200 | 0.0909 |
| 2% hydroxyacetic plus 1% formic | 200 | 0.0009 |
| 5% HCl | 150 | 0.0005 |
| 7.5% sulfamic | 150 | 0.0005 |
| 3% citric | 200 | 0.0011 |
| 5% acetic | 200 | 0.0009 |

EXAMPLE 5

To illustrate that two different sulfur compounds can be employed with like results, corrosion tests were conducted as set forth in Example 1 employing the indicated percent of a second sulfur compound.

| Inhibitor: | Corrosion Rate lbs./ft.²/day |
|---|---|
| 0.1% amine compound of Example 1+0.05 1-allyl-2-thiourea, 0.05 2-mercaptobenzothiazole | 0.00077 |
| 0.1% amine compound+0.05% 50% aqueous Na mercaptobenzothiazole, 1.0% 1-allyl-2-thiourea | 0.0013 |

EXAMPLE 6

In the manner of Example 1 an amine compound was prepared employing an equivalent amount of HCl as the catalysts in place of $H_2SO_4$. The results of corrosion tests conducted in the aforedescribed manner were:

| Concentration of Inhibitor in 150 ml. of 5% $H_2SO_4$, weight percent | Corrosion Rate lbs./ft.²/day |
|---|---|
| 0.2 amine compound 0.1 thiourea | 0.0029 |

EXAMPLE 7

The amine compound of Example 1 was formulated with ⅓ part by weight of a surfactant made by nonylphenol condensing with 20 moles of ethylene oxide and ¹⁄₁₉ part by weight of 1-hexyn-3-ol. This inhibitor was compounded with an aqueous 3.8% solution of ammoniated ethylene diamine tetracetic acid (pH 9.2) and corrosion tests run for 16 hours at 300° F. on mild steel coupons. The results of the tests were as follows:

| Percent by weight inhibitor | Percent by weight sodium mercaptobenzothiazole | Corrosion rate, lbs./ft.²/day |
|---|---|---|
| None | None | 0.06–0.08 |
| 0.1 | | 0.02 |
| | 0.05 | 0.059 |
| 0.1 | 0.05 | 0.001–0.002 |
| ¹ 0.1 | 0.05 | 0.001–0.002 |
| ² 0.1 | 0.05 | 0.001–0.002 |

¹ Without 1-hexyn-3-ol.
² HCl catalyzed amine compound, all other ingredients same as Example 1.

EXAMPLE 8

The following example shows the usefulness as an inhibitor for ammoniated ethylene diamine tetracetic acid solutions of amine compound prepared using amines other than employed in place of the Rosin Amine D, all other conditions and formualtion techniques being the same as in Example 7, e.g., 0.1 amine formulation+0.05 sodium mercaptobenzothiazole in 3.8% aqueous solution of ammoniacal ethylene diamine tetracetic acid (pH 9.2).

| Amine: | Corrosion rate (lbs./ft.²/day) |
|---|---|
| Ammonium sulfate | 0.003 |
| Acetaimde | 0.004 |
| Aminoethylethanolamine | 0.0055 |
| n-Hexyl amine | 0.0014 |
| Diethylenetriamine | 0.0045 |
| Ammonium sulfate ¹ | 0.004 |

¹ In this example, methyl ethyl ketone was substituted for acetone in preparing the ammonia compound, in addition to using the ammonium sulfate to replace the Rosin Amine D.

We claim:
1. A corrosion inhibitor consisting essentially of:
   (A) from 1 to 9 parts by weight of the product of reaction of
      (1) one mole of an amine selected from the group consisting of abietyl-, dihydro abietyl and dehydroabietylamines, ammonium sulfate, acetamide, aminoethyl ethanolamine, n-hexyl amine, diethylene tetraamine, thiourea, 2 - (butylthio) ethylamine, 2-(dodecylthio)-ethylamine and allyl thiourea,
      (2) from 1.5 to 10 moles of acetophenone,
      (3) from 2 to 10 moles of formaldehyde,

(4) from 0.3 to 24 parts by weight of (1), (2) and (3) of formic acid, and all dissolved or suspended in ethylene glycol to form a 10% to 50% by weight solution, obtained by reacting the aforenamed components at from 150° to 250° F. for 1 to 24 hours;

(B) from 0.1 to 1 part of a monoalkyl or dialkylphenoxy polyethoxyethanol, having from 4 to 9 carbon atoms in the alkyl moiety and 2 to 4 carbon atoms in the alkoxy and 5 to 50 ethoxy groups based on (A); and (C) from 9 to 1 parts by weight of a sulfur compound selected from the group consisting of thiourea, allyl thiourea, sodium mercaptobenzothiazole, mercaptothioazoline, sodium thiocyanate, and mixtures thereof.

2. A corrosion inhibitor consisting essentially of 1 part by weight of an acetylenic alcohol having from 3 to 20 carbon atoms per 6 to 19 parts by weight of the composition of claim 1.

3. A corrosion inhibited acid consisting essentially of an aqueous solution of an acid selected from the group consisting of HCl, $H_2SO_4$, formic, sulfamic, acetic, hydroxy acetic, citric, ethylene diamine tetra acetic acid and partially ammoniated ethylene diamine tetra acetic acid having a pH of about 9.2 and from about 0.15 to about 1.2 weight percent of the corrosion inhibitor of claim 1.

4. A corrosion inhibited acid consisting essentially of an aqueous solution of an acid selected from the group consisting of HCl, $H_2SO_4$, formic, sulfamic, acetic, hydroxy acetic, citric, ethylene diamine tetra acetic acid partially ammoniated ethylene diamine tetra acetic acid having a pH of about 9.2 and from about 0.15 to about 1.2 weight percent of the corrosion inhibitor of claim 2.

5. A process for preventing the corrosion of metal in contact with an aqueous acid solution, which comprises contacting the metal surfaces with an aqueous acid solution consisting essentially of an aqueous acid solution selected from the group consisting of HCl, $H_2SO_4$, formic, sulfamic, acetic, hydroxy acetic, citric, ethylene diamine tetra acetic acid having a pH of about 9.2 and from about 0.15 to about 1.2 weight percent of the corrosion inhibitor of claim 1.

6. A process for preventing the corrosion of metal in contact with an aqueous acid solution and the deposition of copper, which comprises contacting the metal surfaces with an aqueous acid solution consisting essentially of an aqueous acid solution selected from the group consisting of HCl, $H_2SO_4$, formic, sulfamic, acetic, hydroxy acetic, citric, ethylene diamine tetra acetic acid and partially ammoniated ethylene diamine tetra acetic acid having a pH of about 9.2 and from about 0.15 to about 1.2 weight percent of the corrosion inhibitor of claim 1.

7. A process for preventing the corrosion of metal in contact with an aqueous acid solution, which comprises contacting the metal surfaces with an aqueous acid solution consisting essentially of a aqueous acid solution selected from the group consisting of HCl, $H_2SO_4$, formic, sulfamic, acetic, hydroxy acetic, citric, ethylene diamine tetra acetic acid, partially ammoniated ethylene diamine tetra acetic acid having a pH of about 9.2 and from about 0.15 to about 1.2 weight percent of the corrosion inhibitor of claim 2.

8. A process for preventing the corrosion of metals in contact with an aqueous solution of an alkylene diamine tetracetic acid ammoniated salt having a basic pH, which comprises contacting the metal surfaces with said aqueous solution consisting essentially of said aqueous solution and from about 0.15 to about 1.2 weight percent of the corrosion inhibitor of claim 1.

References Cited

UNITED STATES PATENTS

| | | |
|---|---|---|
| 1,797,401 | 3/1931 | Calcott et al. |
| 2,238,651 | 4/1941 | Keenen. |
| 2,485,529 | 10/1949 | Cardwell et al. |
| 2,989,485 | 6/1961 | Eilers. |
| 3,047,510 | 7/1962 | Cizek. |
| 3,077,454 | 2/1963 | Monroe et al. |

LEON D. ROSDOL, Primary Examiner

W. E. SCHULZ, Assistant Examiner

U.S. Cl. X.R.

21—2.7; 252—391

PO-1050
(5/69)

UNITED STATES PATENT OFFICE
CERTIFICATE OF CORRECTION

Patent No. 3,634,270      Dated January 11, 1972

Inventor(s) James F. Engle, Billy D. Oakes and Cecil F. Reich

It is certified that error appears in the above-identified patent and that said Letters Patent are hereby corrected as shown below:

Column 5, Example 4, under the heading "Corrosion Rate lbs./ft.$^2$/day"

change "0.0001" to read -- 0.0005 --.

Column 6, Example 8, line 55, change "Acetaimde" to read -- Acetamide --.

Column 7, Claim 1, line 8, delete "from".

line 8, change "to" to read -- or --.

Signed and sealed this 25th day of July 1972.

(SEAL)
Attest:

EDWARD M. FLETCHER, JR.      ROBERT GOTTSCHALK
Attesting Officer      Commissioner of Patents